United States Patent [19]
Osterland

[11] Patent Number: 4,770,586
[45] Date of Patent: Sep. 13, 1988

[54] FASTENER DEVICE

[75] Inventor: Robert W. Osterland, Marine City, Mich.

[73] Assignee: Emhart Industries, Inc., Farmington, Conn.

[21] Appl. No.: 439,265

[22] Filed: Nov. 4, 1982

[51] Int. Cl.$^4$ .............................................. F16B 21/00
[52] U.S. Cl. ..................................... 411/349; 411/549; 24/596; 24/594; 24/590; 16/86 A; 248/345.1
[58] Field of Search ...................... 411/349, 549, 552; 24/590, 591, 592, 593, 594, 595, 596; 248/345.1; 16/86 A

[56] References Cited
U.S. PATENT DOCUMENTS
3,123,389  3/1964  Biesecker ............................ 411/349

Primary Examiner—Gary L. Smith
Assistant Examiner—Curtis B. Brueske
Attorney, Agent, or Firm—Thomas S. Szatkowski

[57] ABSTRACT

A bumper assembly is provided employing a fastener device which is received in a slotted opening formed in a sheet or plate. The fastener device is constructed such that an elongated flange is inserted through the slotted opening, and the fastener may be rotated through one quarter turn at which point it reaches a stop position and is locked in position. Upon reversal of rotation of the fastener through one quarter turn the rotation reaches a stop position at which point the fastener is easily removed from the slotted opening.

4 Claims, 2 Drawing Sheets

FASTENER DEVICE

BACKGROUND OF THE INVENTION

The present invention relates to a fastener device for connecting an element onto a sheet or plate, and more particularly to a fastener device which may be employed with a sheet or plate having one side thereof inaccessible during the fastening operation.

In the assembly of automobiles, appliances, and sheet metal cabinetry there is often a need for providing a device which may be utilized for attachment of an item to the relatively thin sheet or plate of the structure, which in many instances is accessible only from the side on which the attachment is to be made. Various types of fasteners are available for this purpose, however many are difficult to assemble onto the plate, and are not easily removable from the plate, should that feature be desired.

It is therefore an object of the present invention to provide a fastener device for use with a thin sheet or plate material, which is easily assembled from one side of the plate or material only.

It is a further object of the invention to provide a fastener device which is easily assembled to a workpiece, is retained in position by locking engagement during use, and may be removed from, and reassembled onto the workpiece, when desired.

Still another object of the invention is to provide a fastener device which is of unitary construction and is capable of being easily and economically manufactured by a molding process.

An additional object of the invention is to provide a bumper assembly employing a fastener device which achieve the objects set forth above.

SUMMARY OF THE INVENTION

The above objects, and other objects which will be apparent as the description proceeds, are accomplished by providing a fastener device for attachment to a sheet, which device generally comprises a shank having tool engaging means at one end for rotation of the fastener device about the centerline of the shank, and an elongated flange extending across the opposite end of the shank at right angles to the centerline of the shank. A circular flange is supported around the shank at right angles to the center line of the shank and in spaced relation to the elongated flange. A pair of arcuate shaped cam surfaces are provided on the surface of the circular flange facing the elongated flange and aligned at right angles to the elongated flange. The shank portion disposed between the circular flange and the elongated flange has a pair of arcuate surfaces and a pair of right shoulders each having angle surfaces, each pair of arcuate surfaces and shoulders being disposed in opposite quadrants of the shank, and the right angle shoulder each having one surface in alignment with a side surface of the elongated flange. The elongated flange is dimensioned for insertion into a slotted opening formed in a sheet of thickness less than the distance between the elongated flange and the circular flange, such that insertion of the elongated flange into the slotted opening and rotation of the fastener device in one direction through 90 degrees causes the cam surface to fall into the slotted opening locking the fastener in place, and one of the shoulder surfaces of each right angle shoulder inhibits further rotation of the fastener in the direction of rotation by contacting a side of the slotted opening. Rotation of the fastener device in the opposite direction is effective to cause the cam surface to move out of the slotted opening and continued rotation through 90 degrees is effective to cause the opposite shoulder surfaces of each of the right angles shoulders to contact the opposite side of the slotted opening at which point the elongated flange is removable from the slotted opening.

A bumper assembly is further provided by introducing a sleeve of elastomeric material disposed around the shank of the fastener device, extending from adjacent the tool engaging means to a point adjacent the circular flange.

BRIEF DESCRIPTION OF THE DRAWINGS

For a more complete understanding of the invention, reference should be made to the following description taken in conjunction with the accompanying drawing, wherein.

DESCRIPTION OF THE PREFERRED EMBODIMENT

Figure 1:
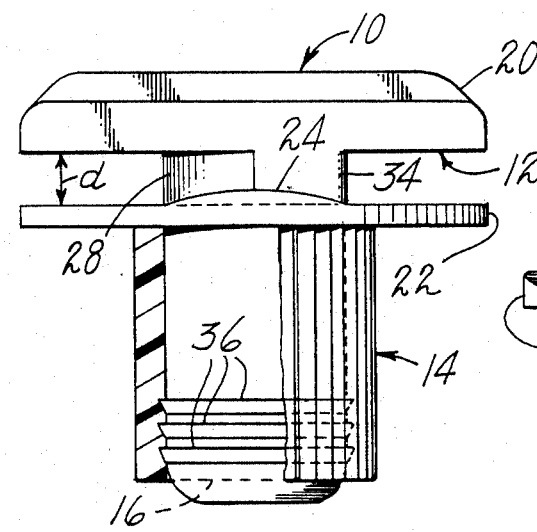
FIG. 1 is a side elevational view, partially in section, showing a bumper assembly employing a fastener device constructed in accordance with the teachings of the present invention.

Referring to the drawing, and in particular to FIGS. 1 through 4 there is shown a bumper assembly 10 employing the present invention. The bumper assembly 10 comprises a fastener device 12 which is formed of molded plastic material such as acetal resin, or the like, and a rubber sleeve 14 assembled onto the fastener device 12.

The fastener device 12 is provided with tool engaging means in the form of a slot 16 formed in one end of a shank 18, and an elongated flange 20 disposed at the opposite end of the shank, substantially at right angles to the centerline of the shank. A circular flange 22 is formed around the shank 18 at right angles to the shank and is disposed in spaced relation to the elongated flange 20. The distance d between the elongated flange 20 and the circular flange 22 is at least as thick, or only slightly greater than the thickness of the material to which the fastener device 12 is to be assembled, and therefore will vary from fastener to fastener to correspond to the particular thickness of the workpiece to which the fastener is to be applied.

Adjacent the periphery of the circular flange 22 there is provided a pair of arcuate cam portions 24 and 26 which extend toward the elongated flange 20. Each of the cam portions 24 and 26 are formed in the shape of an arc of a circle having a cord dimension c defining the width of the cam portion, the width c being substantially the same as the width of the elongated flange 20.

Figure 2:
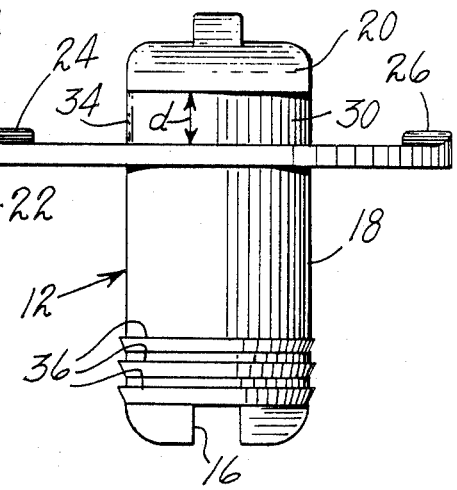
FIG. 2 is a side elevational view showing the fastener device of FIG. 1, rotated about its centerline through 90°.
Figure 3:
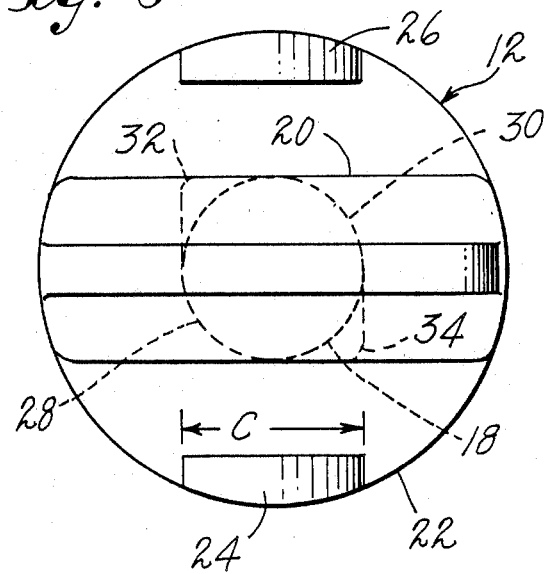
FIG. 3 is a top plan view showing the fastener device of FIG. 2.
Figure 4:
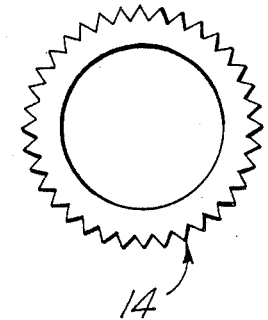
FIG. 4 is a plan view showing the bumper element employed in the assembly of FIG. 1.

Referring in particular to FIG. 3, taken in conjunction with FIGS. 1 and 2, it will be noted that while the shank 18 is substantially cylindrical or circular in cross section over the greater portion of its length, that portion disposed between the elongated flange 20 and the circular flange 22 is of a somewhat different configuration. That segment of the shank 18 is formed having a pair of opposite arcuate surfaces 28 and 30 and a pair of substantially right angle shoulder surfaces 32 and 34 which lie in opposite quadrants of the shank 18. It will be noted that a side of each of the right angle surfaces 34 and 32 is formed primarally by an extension of the side of the elongated flange 20 and therefore when taken together are spaced a distance equivalent to the width of the elongated flange 20. The arcuate surfaces 28 and 30 in the present embodiment are substantially an extension of the surface of the shank 18, and therefore are formed as segments of a cylinder.

In order to employ the fastener device 12 in the bumper assembly 10, a plurality of annular protrusions are provided at the end of the shank 18 at which the slot 16 is located, to provide a plurality of circumferential shoulders 36 extending radially outwardly from the shank 18. By constructing the sleeve 14 out of rubber, or other elastomeric material, and dimensioning the inside diameter substantially the same as the diameter of the shank 18, the sleeve 14 is easily forced over the plurality of protrusions on the shank 18 and is retained by virtue of the shoulders 36 providing interfitting engagement with the sleeve 14, as shown in FIG. 1.

Figure 5:
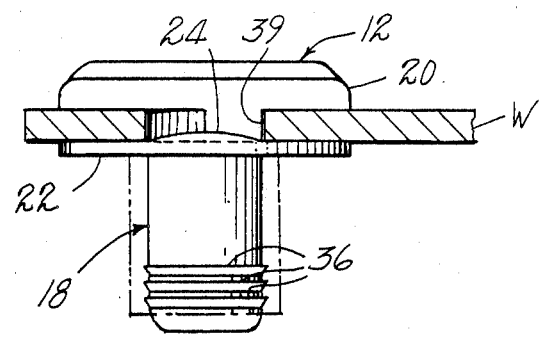
FIG. 5 is a side elevational view partially in phantom line, similar to FIG. 1, showing the bumper assembly of FIG. 1 assembled onto a workpiece.
Figure 6:
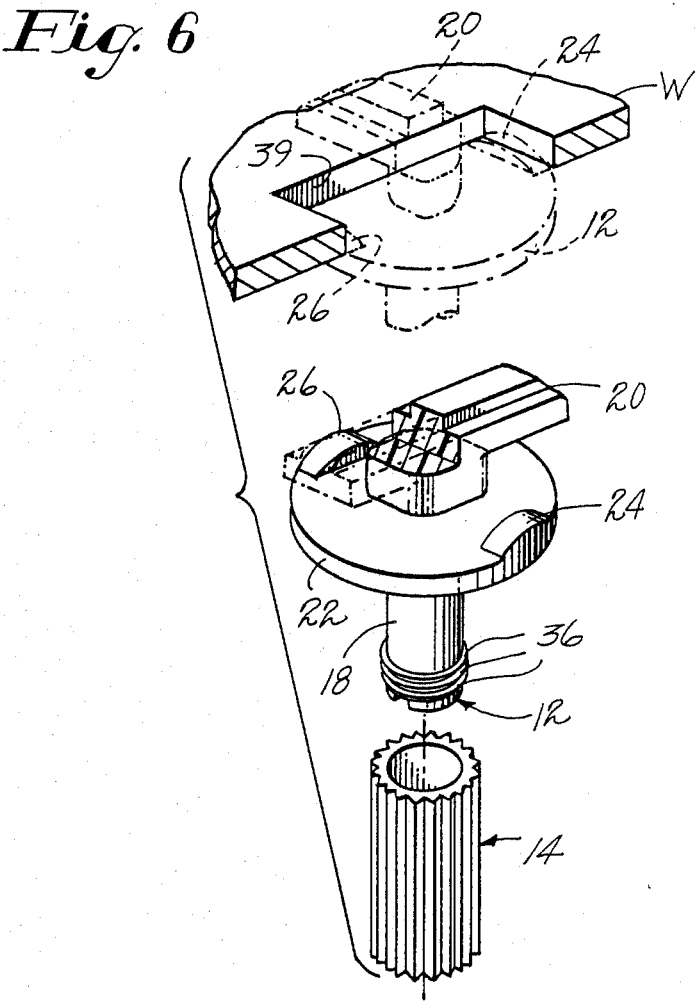
FIG. 6 is an exploded perspective view showing the bumper assembly of FIG. 1 just prior to, and after assembly onto a workpiece.

Referring now to FIGS. 5 and 6, there is shown the assembly of the bumper assembly 10 onto a workpiece W. The workpiece W has a rectangular slot 39 formed with width and length dimensions slightly larger than the elongated flange 20, to facilitate passing the flange 20 therethrough.

In the assembly of the fastener device 12 onto the workpiece W, the elongated flange 20 is first passed through the slot 39 until the cam portions 24 and 26 contact the surface of the workpiece W. As the distance d between the circular flange 22 and the elongated flange 20 is at least the same thickness, or only slightly greater than the thickness of the workpiece W it is necessary to force the fastener device 12 towards the workpiece until the elongated flange 20 is completely past the opposite surface of the workpiece by causing the circular flange 22 to bend slightly. This is achieved by employing a screw driver or other tool in the slot 16 to apply axial force to the shank 18. The circular flange 22 is fabricated of a material and thickness which will permit slight bending of the flange, when pressure is so applied. With the elongated flange 20 past the opposite surface of the workpiece W from the cam surfaces 24 and 26, the driver or other tool may be employed to rotate the fastener device 12 in a clockwise direction thus rotating the elongated flange 20 adjacent the opposite side of the workpiece. It will be noted that when the fastener device 12 is rotated, rotation is permitted by the arcuate surfaces 28 and 30 until the right angles surfaces 32 and 34 abut the edges of the slot 39. At this point, the elongated flange 20 is at its most effective position (at right angles to the slot 39) and the cam portions 24 and 26 snap into the slot 39 to retain the fastener in that efficient holding position.

The rubber sleeve 14 may now be forced over the shank 18 where it is held in place, as described in the above description of the bumper assembly 10.

When it is desired to remove the fastener device 12 from the workpiece W, a tool is inserted into the slot 16 and counter rotated until right angle surfaces 32 and 34 again contact edges of the slot 39, at which point the fastener device 12 is in a position such that the elongated flange 20 is located in alignment with the slot 39, and the fastener device 12 may be simply removed from the workpiece W.

The cam portions 24 and 26, being formed of arcuate configuration, ride over the edges of the slot 39 and onto the surface of the workpiece W during rotation of the fastener device 12, causing slight bending of the circular flange 22, as occurs when the fastener device is inserted into the workpiece W.

By providing the cam portions 24 and 26, which set firmly between the sides of the slot 39, the fastener device 12 is retained in a positive, locked position. Further, the provision of the right angle surfaces 32 and 34 which serve to stop rotation of the fastener device with the elongated flange 20 at right angles to the slot 39 serve to prevent rotation of the fastener past this, its most effective position. Therefore, more stable and rigid fastening device is provided than those suggested by the prior art.

While the fastener device 12 has herein been shown with the sleeve 14 to form a bumper assembly 10, it should be evident that the present invention is applicable to any device wherein a positive locking fastener is required and wherein the fastener is to be assembled onto a workpiece having one surface only accessible to the operator.

It should further be evident that while the device 12, as shown herein, is attached to a workpiece W which is depicted as a single sheet of material, the device may be employed with a plurality of sheets, having a total thickness equal to the thickness of W. In which case, the device then serves to firmly hold the sheets together.

I claim:
1. A bumper assembly comprising:
   a fastener device for attachment to a sheet and having a shank having tool engaging means at one end thereof for rotation of said fastener device about the centerline of said shank;
   an elongated flange extending across the opposite end of said shank at right angles to the centerline of said shank;
   a circular flange disposed around said shank, at right angles to the centerline of said shank, and in spaced relation to said elongated flange;
   a pair of arcuate shaped cam portions disposed on the surface of said circular flange facing said elongated flange and aligned at right angles thereto said cam portions having a cord dimension on said surface which is slightly less than the width of the slotted opening;
   said shank portion disposed between said circular flange and said elongated flange having a pair of arcuate surfaces and a pair of shoulders each having right angle surfaces, each pair of arcuate surfaces and shoulders being in opposite quadrants of said shank and said right angle shoulder having one surface in alignment with a side surface of said elongated flange;
   said elongated flange being dimensioned for insertion into a slotted opening formed in a sheet of thickness less than the distance between said elongated flange and said circular flange, such that insertion of said elongated flange into said slotted opening and rotation of said fastener device in one direction through 90° causes said cam portions to fall into said slotted opening, thereby locking said fastener in place and one of said shoulder surfaces of each right angle shoulder inhibits further rotation of said fastener in said one direction of rotation by contacting a side slotted opening; and a sleeve of elastomeric material disposed around said shank and extending from adjacent said tool engaging means to a point adjacent said circular flange.

2. The assembly of claim 1, wherein said shank portion disposed between said tool engaging means and said circular plane is provided with a plurality of annular protrusions, each providing a circumferential shoulder for interfitting engagement with said sleeve for retaining said sleeve on said shank.

3. The assembly of claim 2, wherein said fastener device is a unitary element formed of plastic material.

4. The assembly of claim 3 wherein the maximum width dimension of said elongated flange is substantially equal to said cord dimension of said cam portion.

* * * * *